Aug. 24, 1926. 1,596,907
A. A. VINEYARD
SYSTEM OF CONCENTRATING SULPHURIC ACID
Filed Sept. 9, 1925   4 Sheets-Sheet 3
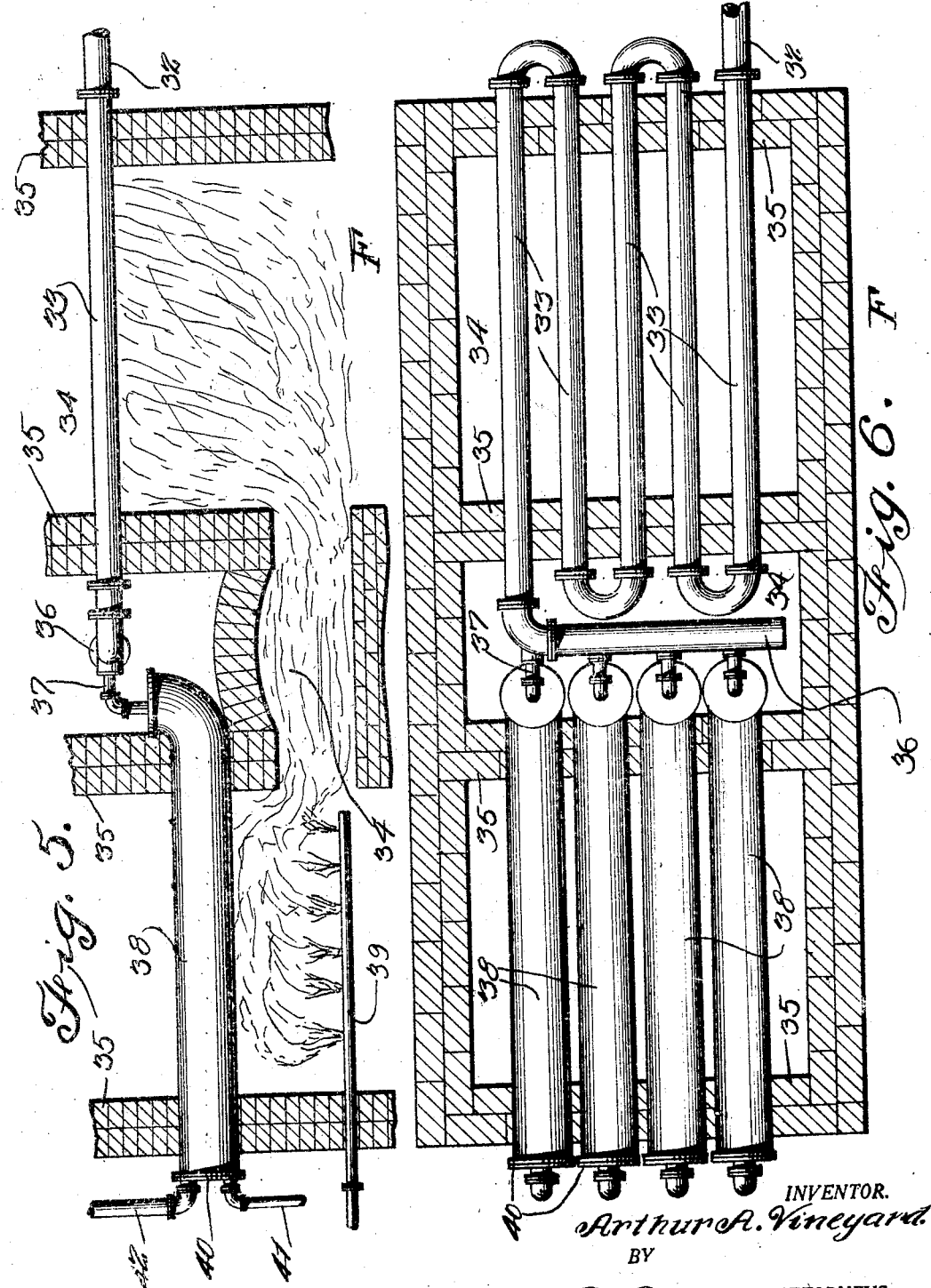
INVENTOR.
Arthur A. Vineyard
BY
Watson E. Coleman
ATTORNEYS.

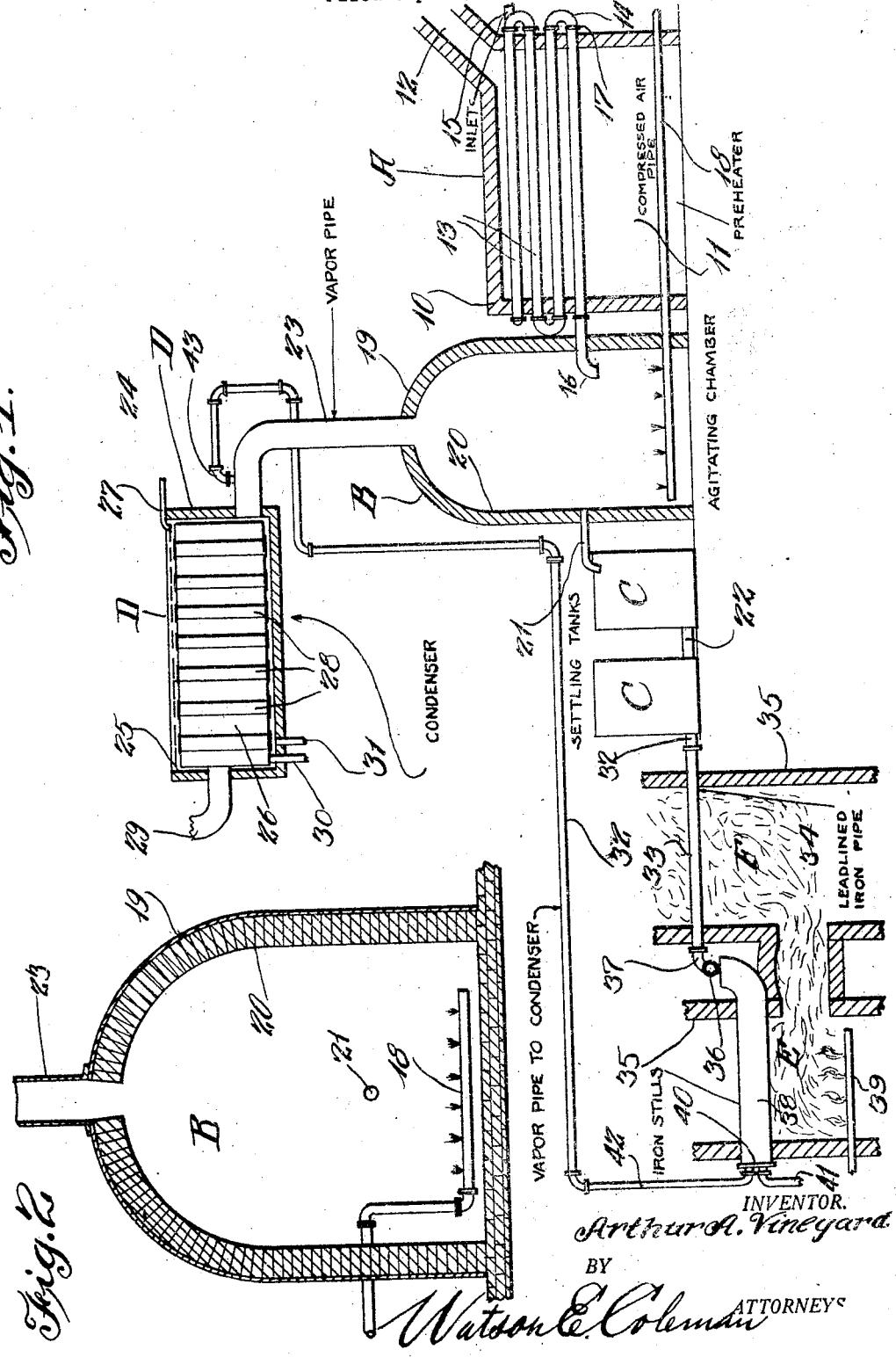

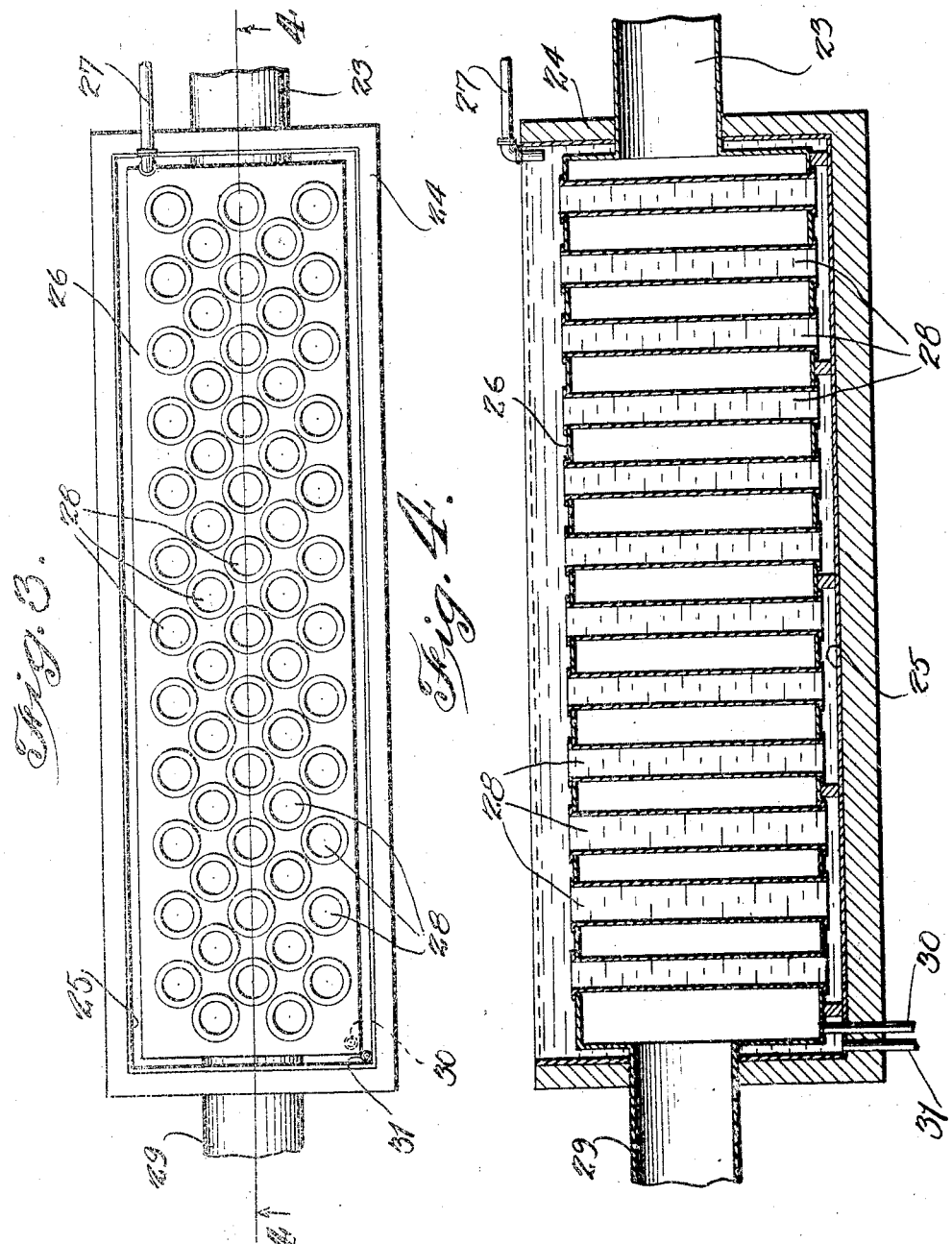

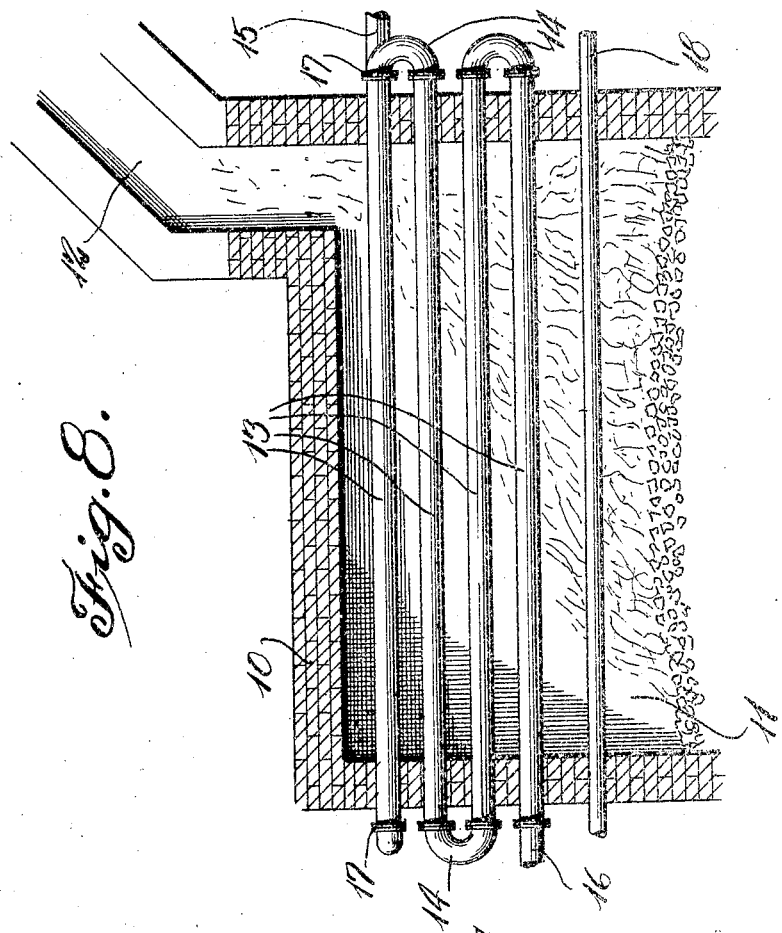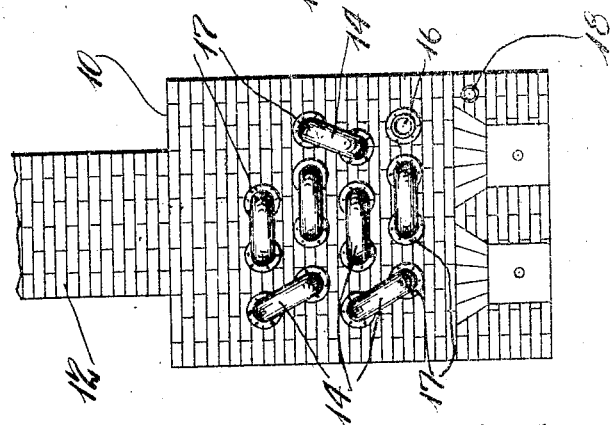

Patented Aug. 24, 1926.

1,596,907

UNITED STATES PATENT OFFICE.

ARTHUR A. VINEYARD, OF WOODRIVER, ILLINOIS.

SYSTEM OF CONCENTRATING SULPHURIC ACID.

Application filed September 9, 1925. Serial No. 55,324.

This invention relates to systems for concentrating sulphuric acid and particularly to an apparatus for this purpose whereby acid that has been used for oil refining, sludge acid, or other weak acid may be concentrated or recovered, the method whereby this result is obtained forming the subject matter of a pending application filed by me on November 27, 1925, Serial No. 71,703 as a division of this present application.

The general object of this invention is to provide an acid concentrating system including means whereby a weak acid may be first submitted to the action of heat and then discharged into an agitating and vapor releasing chamber, the acid therein being submitted to the action of jets of compressed air to cause the agitation of the acid and the liquid being allowed to flow into settling tanks while the vapor and gases which are released in this chamber from the heated acid are carried off to a condenser, and to provide a strong acid concentrator into which the liquid acid in the settling tanks is carried, wherein the acid is submitted to the action of heat to again discharge vapor therefrom, the vapor being carried back to said condenser and thence again discharged as liquid into the strong acid concentrator until a maximum amount of acid has been secured.

A further object is to provide a system of this character which is thoroughly effective, which will secure a maximum amount of strong and concentrated acid, which is relatively cheap to operate, and which is thoroughly effective in practice.

My invention is illustrated in the accompanying drawings, wherein:—

Figure 1 is a diagrammatic view in section showing the several elements of my concentrating system;

Figure 2 is a vertical section of the agitating chamber;

Figure 3 is a top plan view of the condenser;

Figure 4 is a section on the line 4—4 of Figure 3;

Figure 5 is a longitudinal sectional view through the heating chambers showing the heating pipes and concentrating stills;

Figure 6 is a top plan view of the structure shown in Figure 5;

Figure 7 is a front elevation of the preheating system;

Figure 8 is a longitudinal section of the preheating system.

Referring to Figure 1, which shows the complete system more or less diagrammatically, A designates, generally speaking, the heater whereby the weak acid is first submitted to the action of heat, B the agitating and vapor releasing chamber, C a plurality of settling tanks into which the liquid in the chamber B passes, D the condenser into which the vapor from the chamber B passes and by which this vapor is condensed, E the strong acid concentrator, and F the heater for heating the acid passing from the settling tanks into the strong acid concentrator.

Referring now to Figure 8, it will be seen that the heater A comprises a fire-brick heating chamber 10 having the fire-box 11 at its lower end and having a flue outlet 12. Extending through this chamber are a plurality of pipes 13. These are lead-lined iron pipes or other acid-resisting metal formed with returned bends 14 so that the acid will flow continuously from the discharge inlet 15 to the discharge outlet 16. This chamber 10 may be heated by means of oil or any other suitable heating means beneath the series of pipes, it being desirable, of course, to get the greatest efficiency possible. It will be noted that the flanges 17 of the returned bends at each end of the pipes 13 are outside of the furnace wall. This prevents melting of the flanges in the intense heat of the furnace. Passing through the furnace below the series of pipes 13 is a compressed air pipe 18.

The outlet 16 leads from this pipe series into the chamber B, which is the agitating or gas-releasing chamber. This is constructed of an outside shell of lead 19 lined with an acid-proof brick and cement 20 on its entire inside surface, bottom, sides and arch. The air pipe 18, which air pipe where it enters the agitating chamber is made of Duro iron or other acid-resisting metal, has a number of air jets within the chamber whereby the heated compressed air may be discharged upward through the liquid which partially fills the chamber. The discharge of the heated air upward through the liquid acts to thoroughly agitate the liquid, breaks up organic matter, and helps to release gases from the acid. Breaking up the organic matter tends to prevent any retarding of the flow from the chamber to the settling tank.

Extending from the chamber is the pipe 21 which leads into the first settling tank C and from a point adjacent the top of this settling tank leads a pipe 22 into the next settling tank of the series, and so on. The organic matter is removed by skimming from the top or after the acid has been drawn off through the bottom. The settling tank may be washed and the organic matter carried off into a sewer by a hose. If there is no organic matter in large quantities in the acid there is no necessity of carrying the acid from the chamber B in to the settling tank but it may be carried directly to the strong acid concentrator.

Leading from the top of the agitating and vapor-releasing chamber is a vapor outlet pipe 23. This pipe leads into the condenser D. This consists of an outer wooden jacket 24 lined with a lead tank 25, and disposed within this lead tank is a shell 26 of lead. The vapor inlet pipe 23 leads through the wall of the condensing tank and into this shell 26 and discharges the vapor therein. This shell 26 is entirely surrounded by water contained within the tank and fed thereto by the water inlet pipe 27.

Passing vertically through the shell are passages 28, the walls of which are of lead and through which the water passes and circulates so that the vapor within this condensing tank is continually submitted to the cooling action of water. From the end of this shell opposite the inlet pipe 23 is an exit pipe 29, while from one end of this shell and leading downward through the bottom of the water tank is an acid drip outlet 30. Leading from the bottom of the tank is a water outlet 31. The acid from the settling tank C or the acid coming directly from the chamber B, if no settling tanks are used, passes into a pipe 32 and thence into a lead lined pipe 33 that passes backward and forward by a series of convolutions through a heating chamber 34 in the fire-box F.

It will be noted here, again, that the flanges of the returned bends at each end of the convoluted line of pipe are disposed entirely exteriorly of the forward and rear walls 35 of this heating chamber. The pipe 33 after it passes through the heating chamber extends through the forward wall thereof and then extends laterally in the form of a header 36 and from this header 36 extend a plurality of discharge pipes 37, these pipes extending forwardly and downwardly and discharging into the upturned ends of a plurality of relatively large pipes 38. These pipes 38 are of cast iron, Duro iron or other acid-resisting metal pipe. These are disposed within the chamber E and submitted to the action of heat from an oil burner 39 or other heating means.

The forward end of each pipe 38 is provided with a head 40 and from this head extends an outlet pipe 41 leading to a storage tank and from the upper portion of this head leads a vapor outlet pipe 42 which extends back to the condenser D and enters the vapor inlet pipe leading to this condenser at 43. Thus any vapor rising from the liquid in the cast iron pipes 38 will be carried back and re-condensed. The strong acid concentrator is designed to raise the gravity of the acid to 66° and it is to be noticed that the furnace is so constructed that the heat from the large still pipe furnace E is used in the fire-box F for the purpose of heating the pipes 33.

The value of this system of concentrating sulphuric acid resides in the fact that the cost of concentration is reduced at least one-half. Furthermore, the system eliminates the very offensive gas which is destructive to property both in the plants and outside the plants, which gas is produced where the open system of concentration is in use. Another advantage resides in the small loss from concentrating, as gases which usually escape in ordinary systems are condensed and concentrated in this system. Furthermore, the cost of upkeep and labor is relatively small and this, of course, acts to reduce the cost of concentration.

I claim:—

1. An acid concentrating system including an acid heater, an agitating chamber into which the liquid flows from the heater, means in said chamber for agitating the liquid, release vapor and gases therefrom and break up the organic matter into small particles, a condenser into which the vapors from the agitating chamber are carried, a second heater into which the liquid from the agitating chamber flows, and a series of concentrating stills into which the liquid from said last named heater flows, each of said concentrating stills having a vapor outlet leading to said condenser.

2. A sulphuric acid concentrating system including an acid heater, an agitating chamber into which the liquid flows from the heater, means for injecting heated air under pressure into the liquid in the agitating chamber to thereby agitate the liquid, release vapor and gases therefrom and break up the organic matter into small particles, a condenser into which the vapors from the agitating chamber are carried, a second heater consisting of a series of connected pipes disposed in a heating chamber and through which series of pipes the liquid from the agitating chamber flows, a series of concentrating stills into which the liquid from said last named heater flows, the concentrating stills each consisting of a cylindrical member having an outlet for liquid at one end and an outlet for vapor at the same end, and a furnace within which the concentrating still is disposed, each concentrating still having a vapor outlet leading to the inlet of said condenser.

3. Means for concentrating weak sulphuric acid comprising a preheater consisting of a heating chamber, a series of connected pipe sections passing back and forth across said chamber, the pipe sections being connected by elbows disposed exteriorly of the wall of said chamber, an agitating chamber into which the liquid is discharged, a compressed air pipe passing through the preheating chamber and having a plurality of jets discharging into the liquid in the agitating chamber, a settling tank into which the liquid from the agitating chamber passes, a condenser into which the vapor from the agitating chamber passes, the condenser having a liquid outlet, a second heater consisting of a heating chamber, a series of connected pipes extending back and forth across said chamber, through which connected pipes the liquid passes, a series of stills into which the liquid from the connected pipes discharges, each still being cylindrical in form and disposed horizontally, a heating chamber within which the stills are disposed and having means for applying heat to the stills, the ends of the stills having means for drawing off the concentrated acid and having a vapor outlet, the vapor outlets of all of the stills being connected to the vapor inlet of the said condenser.

4. Means for concentrating weak sulphuric acid comprising a furnace, a series of stills extending across the furnace, each consisting of a hollow tubular member having one end extending upward, inlet pipes leading into the upwardly extending end of each still, means for heating the liquid discharged through said pipes into the stills, a distillate pipe extending downward from the opposite end of the still, and a vapor pipe leading from the opposite end of the still and extending upward.

5. Means for concentrating weak sulphuric acid including two heating chambers, a series of stills extending across one heating chamber and through the walls thereof, one end of each still being extended upward, a pipe extending in a circuitous course across said heating chamber and at its ends extending from the wall thereof, and formed to provide a heater having pipes discharging into the upturned ends of each of said stills, the opposite end of each still being provided with a liquid discharge and a vapor outlet.

In testimony whereof I hereunto affix my signature.

ARTHUR A. VINEYARD.